July 8, 1947.  W. B. FAGEOL  2,423,590
WHEELED VEHICLE FOR CHILDREN
Filed Oct. 1, 1945  3 Sheets-Sheet 1
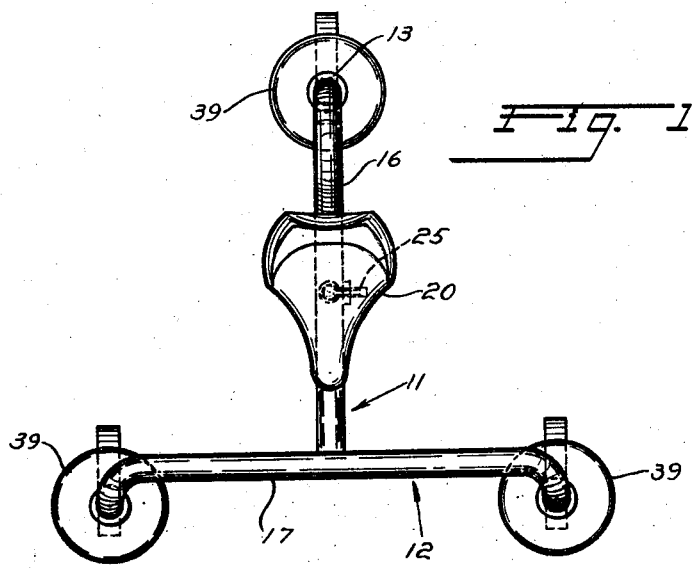
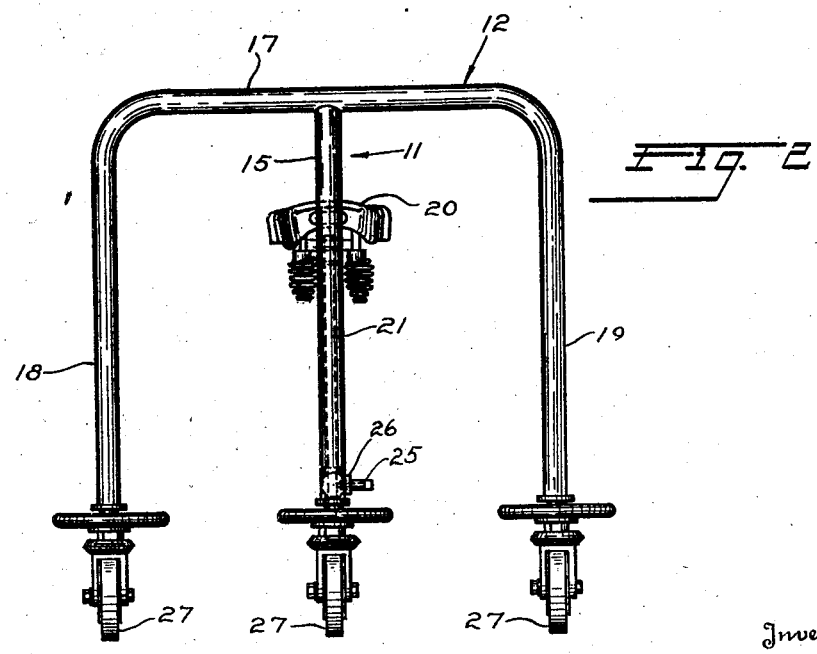
Inventor
William B. Fageol
By Strauch & Hoffman
Attorneys

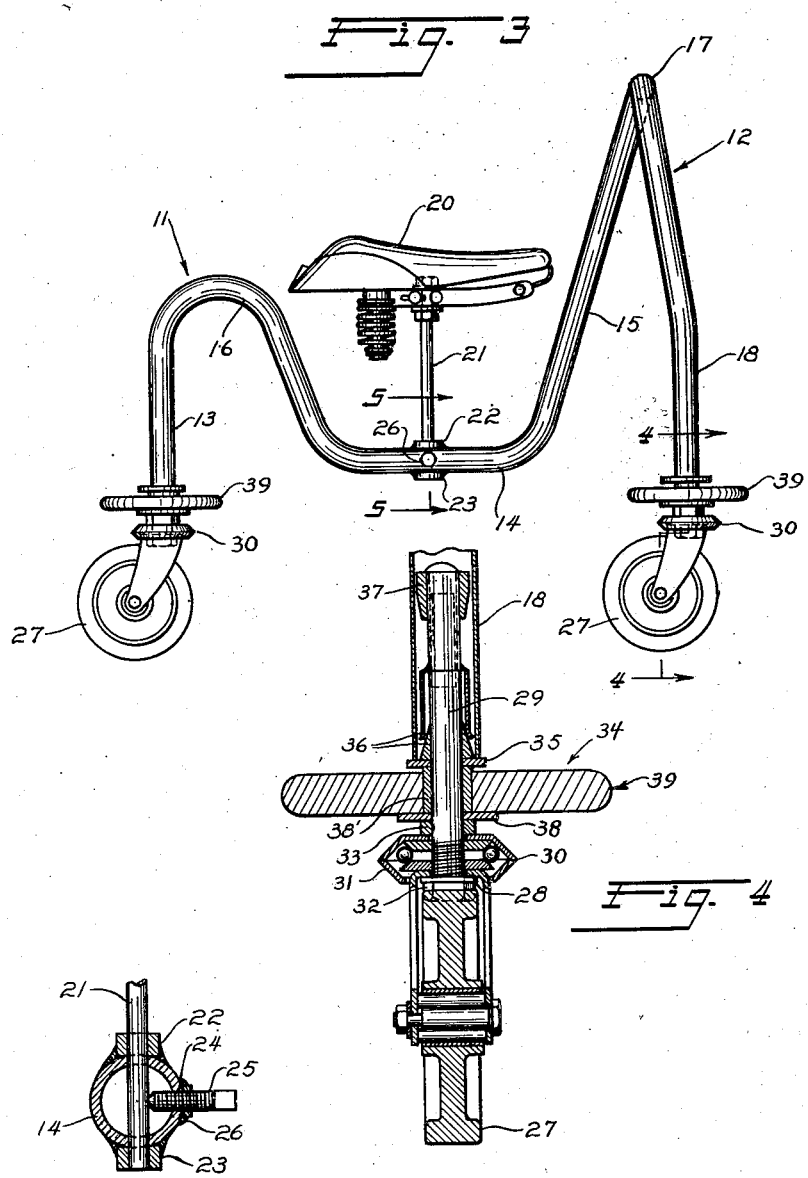

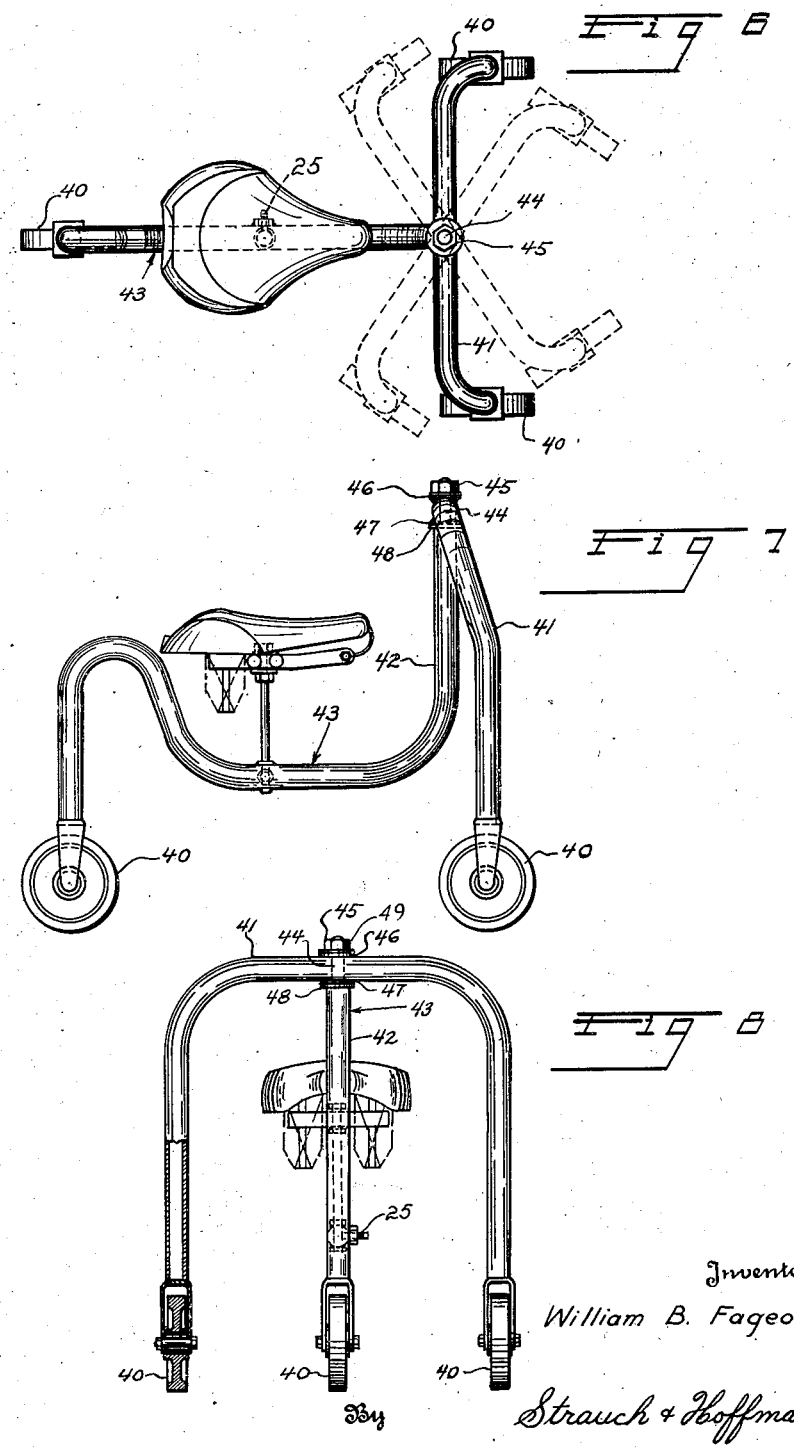

Patented July 8, 1947

2,423,590

UNITED STATES PATENT OFFICE 2,423,590

WHEELED VEHICLE FOR CHILDREN

William B. Fageol, Kent, Ohio

Application October 1, 1945, Serial No. 619,613

9 Claims. (Cl. 280—87.01)

This invention relates to a "Walkie bike," or to wheeled toys or vehicles of the type adapted to be mounted by children and propelled by foot while seated thereon.

Devices of similar nature have been well known on the market for a long time. Among the better known of these for instance has been the "Kiddie Car" which has a seat supported by two wheels in back and a single steerable wheel in front.

I have devised a novel wheeled toy or vehicle of this general type which is of simple but rugged construction affording an unimpeded movement of the legs so that the user can be seated comfortably while propelling himself by a walking movement of the legs without scuffing the feet and ankles on parts of the device.

It is accordingly a primary object of my invention to provide an improved and novel wheeled toy or vehicle.

It is another important object of my invention to provide an improved wheeled toy or vehicle adapted to be propelled by a walking motion of the legs and wherein no impediments are presented to a free movement of the legs.

Another important object of my invention is the provision of a novel and simplified frame or body for a wheeled toy or vehicle.

Other objects will become apparent as the description proceeds in connection with the appended drawings, wherein:

Figure 1 is a top plan view of a vehicle constructed in accordance with one embodiment of my invention;

Figure 2 is a front elevation of the embodiment shown in Figure 1;

Figure 3 is a side view in elevation of the embodiment shown in Figure 1;

Figure 4 is a sectional view substantially along the line 4—4 of Figure 3, looking in the direction of the arrows;

Figure 5 is a sectional view substantially along the line 5—5 of Figure 3, looking in the direction of the arrows;

Figure 6 is a top plan view of a vehicle constructed in accordance with a second embodiment of my invention;

Figure 7 is a view in side elevation of the embodiment of Figure 6; and

Figure 8 is a view in front elevation and partly in section of the embodiment of Figure 6.

As shown in Figures 1 to 3, the vehicle frame is simply constructed of two pieces of tubular metal comprising a vertical frame 11 and a handle frame 12. The vertical frame 11 comprises a piece of metal tubing lying substantially in a vertical plane and comprising essentially a vertical wheel post 13, a substantially horizontal seat bar 14 and an inclined portion 15. The exact shape of the vertical frame 11 need not be as shown, but the wheel post 13 is sufficiently long to accommodate the stem of a caster wheel which is shown in detail in Figure 4. The seat bar 14, which is preferably horizontal, is joined to the wheel post 13 by a gooseneck section 16, and as shown in Figure 3 the inclined portion 15 slopes upwardly at an acute angle.

At its upper and forward end the inclined portion 15 meets and is fixed, as by welding, to the midpoint of the handle frame 12 which is substantially in the form of an inverted U. The handle frame 12 has a horizontal handle bar portion 17 substantially at right angles to the plane of the vertical frame 11. The handle bar portion 17 terminates at each end in wheel posts 18 and 19 which are in a plane which is substantially vertical and at right angles to the plane of the vertical frame 11.

A conventional bicycle or velocipede type seat 20 is adjustably mounted in the conventional manner on a seat post 21, which, as best shown in Figures 3 and 5, is substantially vertical and passes through aligned bosses 22 and 23 on the seat bar 14 of the vertical frame 11. The bosses serve to reinforce the seat bar 14 at the passageways therethrough and form a longer bore for the seat post 21. Also, as best shown in Figures 3 and 5, the seat bar has a horizontal bore 24 in one side, intersecting the bore for the seat post for the passage of a clamp screw 25. A conventional nut 26 is welded to the seat bar with its threads concentric to the bore 24, the clamp screw 25 having threaded engagement with the nut to clamp the seat post 21 at any desired vertical height as will be understood.

Each of the wheel posts 13, 18 and 19 is provided at the bottom thereof with a similar freely castered wheel 27, the structural details of which are shown in Figure 4. As shown, the brackets holding the wheel axle are provided with an apertured bridge portion 28. Bridge portion 28 engages one race of thrust bearing 30 provided with an open sided cover member 31. The shank of a headed bolt 29, serving as a caster post, extends through a bore in bearing 30 and apertured bridge 28 and loosely receives a spacer sleeve 33 resting on cover 31, an enlarged bumper assembly 34, resting on sleeve 33, a washer 35 resting on assembly 34 for limiting the distance the caster post can be inserted into the wheel post, an expandable frictional caster mounting assembly 36 resting on washer 35 and a sleeve 37 for centering the caster in the wheel post. While bumper assembly 34 may assume any desired construction, it preferably comprises a supporting washer 38, an axially elongated spacer sleeve 38′ positioned with its ends abutting washers 35 and 38 and an enlarged, relatively thick bumper washer 39 of wood, rubber or other relatively soft material slidingly mounted on sleeve 38′ and of a thickness slightly less than the length of sleeve 38′. A nut and washer assembly 32 threadedly secured on the lower threaded end of bolt 29 secures bolt 29 and its associated structure to bridge 28 of the axle brackets and is adapted to adjust the diameter of frictional mounting assembly 36 by axially moving the head of bolt 29 toward or away from bridge 28 to secure a good frictional fit with the wheel post.

The ends of the wheel posts rest on the upper face of washers 35 and directly transmit the weight of the frame and rider through sleeve 38′, washer 38, sleeve 33, bearing 30 and the wheel brackets. As a consequence, bolt 29 acts primarily as a positioning member and the wheel brackets and lower race of bearing 30 are free to rotate so that the castered wheels 27 are trailing in their normal position, irrespective of the direction of movement of the vehicle, and the edge of the bumper collar projects forward beyond the leading edge of the wheel in the direction of movement. This is apparent from Figures 1 and 3 where the castered wheels are shown trailing in the position they will have when the vehicle is moving forward. The bumper collars therefore will normally be the first parts of the vehicle to engage an obstruction such as furniture or the like, and because of their relatively soft materials they will not mar the object struck.

It will be noted that by reason of the fact that the rear castered wheel 27 is behind the seat 20 and in the same vertical plane as the seat and vertical frame 11 it does not offer any obstruction to the free movement of the feet of the child using the vehicle. It will also be noted that, by reason of the fact that the forward wheels are widely spread apart out of the path of movement of the feet and legs, and have no horizontal connecting bar between them except for the handle bar portion 17 at the top, there is no impediment offered to free movement of the feet and legs by the forward wheels and their supports.

The embodiment illustrated in Figures 6, 7 and 8 differs from the previously described embodiment chiefly in the fact that the wheels 40 are fixedly mounted onto the wheel posts instead of being castered, and the vehicle is steered by hand. In this embodiment the handle frame 41 is pivotally mounted on top of the forward portion 42 of the vertical frame 43, for rotation about a substantially vertical axis. The forward portion 42 is substantially vertical, at least at its upper end, instead of being inclined as in the first embodiment, so as to provide a vertical axis for the pivotal mounting of the handle frame 41. In the illustrated embodiment the upper end of the forward portion 42 is provided with a vertical post 43 which may be welded in the top thereof, having a smooth portion passing through aligned holes in the center of the handle frame 41 and being threaded on the top to receive a locking nut 45. Washer type bearings 46 and 47 are welded to the top and bottom of the handle frame 41 in alignment with the holes therethrough and a similar washer 48 is welded to the top of the forward portion 42 of the vertical frame, providing a bearing against which the washer type bearing 47 has contact. A similar washer type bearing 49 is placed on the vertical post 44 between the nut 45 and the bearing 46. While they are not shown in the drawings, bumper collars similar to the bumper collars 31 of the first described embodiment may be attached to the bottoms of the wheel posts in the second described embodiment as will be understood.

The vehicle illustrated by either embodiment is of simple rugged construction, easily fabricated and low in cost, as well as of novel construction whereby there is no interference with movements of the feet. While the device has been described as a child's vehicle, it is to be understood that it is not intended to be limited to such use since it is adaptable to be made in sizes for use by adults as well.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A wheeled toy or vehicle comprising a longitudinally extending vertical frame having a seat thereon and a wheel behind said seat and at the rear of said frame; a transverse frame substantially in the form of an inverted U connected substantially at its mid-point to said vertical frame adjacent the front thereof, the legs of said transverse frame extending downwardly and widely separated for substantially their whole length to avoid interference with the legs of the rider, and the transverse frame portion connecting said legs forming a handle bar, and wheels at the bottom ends of the legs of said transverse frame.

2. The device described in claim 1, wherein said wheels are castered.

3. The device described in claim 1, wherein said transverse frame is pivotally attached to said vertical frame.

4. A wheeled toy or vehicle comprising a longitudinal vertical frame having a wheel post at the rear, an upwardly extending forward portion, and an intermediate portion forming a seat support; a transverse frame comprising a handlebar connected substantially at its midpoint to the forward portion of said vertical frame, said transverse frame including legs extending downwardly from the end portions of said handlebar to form wheel posts, said legs being widely spaced to avoid interference with the legs of the user; and wheels at the bottoms of the wheel posts of said frames.

5. A wheeled toy or vehicle comprising a longitudinal tubular vertical frame having a downwardly extending wheel post at the rear, an upwardly extending forward portion and an intermediate bar forming a seat support; a seat attached to said seat support; a transverse tubular frame substantially in the form of an inverted U to form a handle bar and a pair of downwardly extending legs, said handle bar being connected substantially at its mid-point to the upper forward portion of said vertical frame, said legs being widely separated for substantially their whole length to avoid interference with the legs of the user; and a wheel at the bottom of each of said legs and said wheel post.

6. A wheeled toy or vehicle comprising a longitudinal vertical frame having a downwardly extending wheel post at the rear, an upwardly extending forward portion, and an intermediate portion forming a seat support; a seat attached to said seat support; a forward transverse frame comprising a handle bar connected at its central portion to an upper forward portion of said vertical frame, said forward transverse frame including a downwardly extending leg depending from each end portion of said handle bar, said legs of said transverse frame being widely spaced to avoid interference with the legs of the user, and forming wheel posts at their lower ends, and wheels at the bottoms of the wheel posts of said frames.

7. A frame for a wheeled toy or vehicle comprising a longitudinal tubular vertical frame member having a downwardly extending post at the rear, an upwardly extending forward portion, and an intermediate bar forming a seat support; a transverse tubular frame member substantially in the form of an inverted U connected at its mid-point to an upper and forward portion of said longitudinal frame to form a handle bar with downwardly depending legs at the ends thereof, said legs being widely spaced to avoid interference with the legs of the user, said post and the bottoms of said legs being adapted to have wheels attached thereto.

8. The device described in claim 7, wherein said transverse frame is pivotally attached to said longitudinal frame.

9. A wheeled toy or vehicle comprising a longitudinal vertical frame having means forming a wheel support at the rear, an upwardly extending forward portion, and intermediate portion forming a seat support; a transverse frame comprising a handlebar connected substantially at its midpoint to the forward portion of said vertical frame, said transverse frame including legs extending downwardly from the end portions of said handlebar to form wheel supports adjacent their bottom portions, said legs being widely spaced to avoid interference with the legs of the user; and castered wheels on the wheel supports of said frames, said wheel supports being adapted to receive the caster posts of said wheels.

WILLIAM B. FAGEOL.

REFERENCES CITED

The following references are of record in the file of this patent:

UNITED STATES PATENTS

| Number | Name | Date |
| --- | --- | --- |
| 1,286,539 | Colon | Dec. 3, 1918 |
| 248,441 | Fowler | Oct. 18, 1881 |
| 1,300,292 | Oshana | Apr. 15, 1919 |
| 1,634,846 | Nicks | July 5, 1927 |
| 2,316,100 | Nelson | Apr. 6, 1943 |
| 2,311,424 | Weller | Feb. 16, 1943 |
| 1,222,414 | Klinsmann | Apr. 10, 1917 |
| De. 144,703 | Fageol | May 14, 1946 |